United States Patent [19]
McElreath et al.

[11] Patent Number: 6,154,151
[45] Date of Patent: *Nov. 28, 2000

[54] INTEGRATED VERTICAL SITUATION DISPLAY FOR AIRCRAFT

[75] Inventors: Kenneth W. McElreath; Scott A. Pingsterhaus, both of Cedar Rapids, Iowa

[73] Assignee: Rockwell Collins, Inc., Cedar Rapids, Iowa

[*] Notice: This patent issued on a continued prosecution application filed under 37 CFR 1.53(d), and is subject to the twenty year patent term provisions of 35 U.S.C. 154(a)(2).

[21] Appl. No.: 09/097,631

[22] Filed: Jun. 16, 1998

[51] Int. Cl.$^7$ ...................................................... G08B 23/00
[52] U.S. Cl. .......................... 340/970; 340/961; 340/976; 701/14; 701/18
[58] Field of Search ...................................... 340/971, 972, 340/973, 974, 975, 980, 961, 970, 968, 976, 977, 963; 701/14, 18, 9, 120

[56] References Cited

U.S. PATENT DOCUMENTS

| | | | |
|---|---|---|---|
| 4,283,705 | 8/1981 | James et al. | 340/27 NA |
| 4,563,742 | 1/1986 | McElreath . | |
| 4,792,906 | 12/1988 | King et al. . | |
| 4,796,190 | 1/1989 | Cummings . | |
| 4,860,007 | 8/1989 | Konicke et al. | 340/173 |
| 4,914,733 | 4/1990 | Gralnick | 340/961 |
| 5,043,727 | 8/1991 | Ito | 340/984 |
| 5,111,400 | 5/1992 | Yoder | 342/29 |
| 5,216,611 | 6/1993 | McElreath . | |
| 5,289,185 | 2/1994 | Ramier et al. | 340/973 |
| 5,412,382 | 5/1995 | Leard et al. | 340/974 |
| 5,420,582 | 5/1995 | Kubbat et al. | 340/974 |
| 5,475,594 | 12/1995 | Oder et al. | 340/971 |
| 5,614,897 | 3/1997 | Durnford | 340/973 |
| 5,657,009 | 8/1997 | Gordon | 340/968 |

OTHER PUBLICATIONS

*Avionics,* "Enhanced Ground Proximity Warning", p. 24, Aug., 1997.
*Traffic Alert and Collision Avoidance System Operator's Manual,* p. 60, Oct., 1990.
"Epic Avionics In Flight Test", Paul Proctor, p. 70, Aviation Week & Space Technology, Sep. 22, 1997.

*Primary Examiner*—Brent A. Swarthout
*Attorney, Agent, or Firm*—Nathan O. Jensen; Kyle Eppele; James P. O'Shaughnessy

[57] ABSTRACT

An integrated vertical situation display (IVSD) for an aircraft, and method of displaying vertical situation information, are disclosed herein. The IVSD includes an electronic display for displaying the vertical situation of the aircraft, input interfaces for receiving vertical profile information signals, and a processing circuit for reading the information signals and generating display signals applied to the display therefrom. The display has a vertical profile view area to display the vertical situation in front of, above, and below the aircraft. The information sources may include a flight management system, traffic alert and collision avoidance system (TCAS) and a ground proximity warning system. Vertical situations are displayed by visual indicia representing, for example, aircraft position, path angle, flight path, waypoints, TCAS targets, altitude preselect, decision height, runway, ground contour, and vertical speed. The integrated display minimizes the cognitive workload of the operator in assessing the total vertical situation.

25 Claims, 3 Drawing Sheets

INTEGRATED VERTICAL SITUATION DISPLAY FOR AIRCRAFT

FIELD OF THE INVENTION

The present invention relates generally to the field of aircraft instrumentation displays. More particularly, the present invention relates to an integrated vertical situation display (IVSD) for an aircraft which arranges and presents vertical situation information consistently.

BACKGROUND OF THE INVENTION

To comply with current and proposed requirements, the pilot or co-pilot of an aircraft must have access to a variety of vertical situation information from a number of sources to allow the vertical maneuvering situation of the aircraft to be accurately and quickly assessed.

The amount of vertical situation information which the pilot or co-pilot needs to assess is increasing with the imposition of new requirements intended to increase both the airspace capacity and the safety of air travel. The newer requirements include the Global Air Traffic Management (GATM) system for use in managing air traffic, Reduced Vertical Separation Minimums (RVSM) for reducing the vertical separation requirements between aircraft to increase airspace capacity, Traffic Alert and Collision Avoidance System (TCAS) advisories to alert pilots about potentially hazardous aircraft targets in the area, and the Enhanced Ground Warning Proximity System (EGPWS) to indicate ground contours to help maintain clearance.

The vertical situation information which must be presented to the pilot to allow him to fly and navigate the aircraft, and to meet these newer requirements, may include the position of the aircraft, the profile path angle of the aircraft, the altitude preselect provided by air traffic control, the decision height for a particular landing approach, the projected flight path, positions of waypoints along the flight path, positions and the degree of threat posed by nearby aircraft targets, the location and elevation of runways, the ground contour, the radio altitude, Baroset and Baroset altitude, the aircraft's vertical speed and vertical speed setting, and possibly free format messages from the air traffic controller. A pilot's need to assess all of this information within a common reference frame requires the pilot to expend much cognitive processing when the information is presented on a number of different displays using different formats.

In conventional aircraft instrumentation, the pilot must observe vertical situation information presented in different formats on separate displays in an instrument panel. For example, some of the information is presented as pictorial data while other information is presented as digital data. In order to assess the vertical situation, the pilot must assimilate the different types of data and formulate a mental image of what the vertical situation is with respect to ground clearance, altitude, flight path assignments, other aircraft traffic, and navigation.

For example, one conventional instrumentation system includes a separate electromechanical display for each piece of vertical situation information. The system includes separate Barometric Altimeter indicators, Radar Altimeter indicators, and Vertical Speed indicators. The pilot or co-pilot must examine the information from each display, and then generate a mental image to integrate the information and determine its interrelationships.

Another aircraft instrumentation system includes an electronic flight display with a separate display element for each piece of vertical situation information. These separate elements are presented using different formats such that each piece of information remains separate and disconnected from the other pieces. For example, traffic advisory information may be shown in a horizontal format, while altitude information is shown on a vertical tape. Thus, to assess the entire vertical situation, the pilot must still read the separate data which is presented in different reference frames, make mental translations of the separate data into a common reference frame, and then form a mental picture to integrate the data within this frame. This task requires much cognitive processing to assess the vertical situation, and leads to high levels of workload, stress, and fatigue. The need to make the mental translations may also lead to inaccurate results.

Accordingly, it would be advantageous to provide an improved aircraft instrumentation system for displaying the complete vertical situation of the aircraft. It would be advantageous to provide an instrumentation system wherein vertical situation information from a number of sources is presented and arranged to allow a pilot to rapidly and accurately assess the complete vertical situation with minimum cognitive processing.

SUMMARY OF THE INVENTION

One embodiment of the invention relates to an integrated vertical situation display (IVSD) for an aircraft having vertical profile information sources. The IVSD includes an electronic display, with a vertical profile view area, for displaying the vertical situation in response to display signals, input interfaces for receiving vertical profile information signals from the information sources, and a processing circuit which reads the vertical profile information signals from the input interfaces and generates the display signals therefrom. The display signals cause the display to generate visible indicia representing the vertical profile information signals within the vertical profile view area. The visible indicia are mapped to locations within the vertical profile view area using common scaling.

Another embodiment of the invention relates to an IVSD for an aircraft having vertical profile information sources. The IVSD has display means for displaying the vertical situation in response to display signals. A profile view area displays the vertical situation for distances in front of, above and below the aircraft, thereby defining a profile window. The IVSD includes means for receiving a vertical situation set signal from an input device supported on a control panel, and for receiving vertical profile information signals from the information sources. The IVSD includes means for generating the display signals from the information signals and the vertical situation set signal. When the display signals are applied, the display means generates visible indicia representing the information signals and the vertical situation set signal within the vertical profile view area. The visible indicia are mapped to locations within the vertical profile view area.

Another embodiment of the invention relates to a method of displaying vertical situation information in an aircraft. The method includes providing an electronic display, defining a vertical profile view area thereon for displaying the vertical situation for distances ahead of, above, and below the aircraft, thereby defining a profile window. The method includes receiving vertical profile information signals from sources, generating display signals for causing the display to generate visible indicia representing the vertical profile information signals within the vertical profile view area, and applying the display signals to the display. Common scaling is used to map the visible indicia to locations within the vertical profile view area.

BRIEF DESCRIPTION OF THE DRAWINGS

The invention will become more fully understood from the following detailed description, taken in conjunction with the accompanying drawings, wherein like reference numerals refer to like parts, in which.

DETAILED DESCRIPTION OF THE PREFERRED EMBODIMENTS

Figure 1:
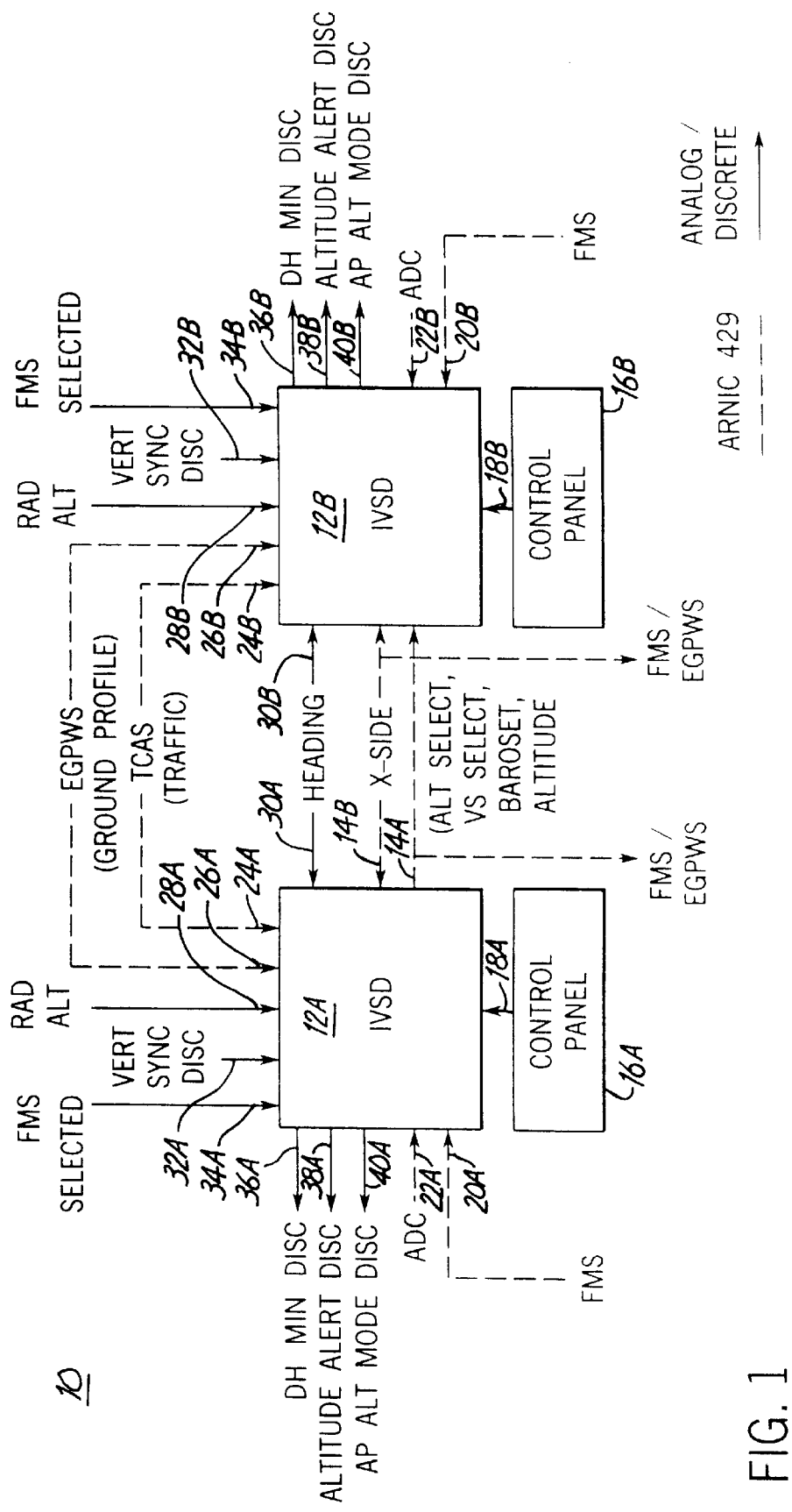
FIG. 1 is a block diagram of an aircraft avionics system including pilot and co-pilot Integrated Vertical Situation Displays (IVSDs)

Referring to FIG. 1, an aircraft avionics system 10 includes first and second Integrated Vertical Situation Displays (IVSDs) 12A and 12B mounted in the cockpit of an aircraft (not shown) for use by the pilot and co-pilot. Pilot and co-pilot IVSDs 12A and 12B cross-link data to each other in both directions via data interfaces 14A and 14B. This cross-side data may include Altitude Preselect (AP), Vertical Speed (VS) Select, Baroset and Altitude data, depending on whether it is desired to have coordinated (synchronized) or independent pilot settings.

IVSDs 12A and 12B also receive operator control data from control panels 16A and 16B via data interfaces 18A and 18B, respectively. The control data represents settings of operator-actuatable input devices supported by control panels 16A and 16B, as described in relation to FIG. 2.

In one embodiment, cross-side data interfaces 14A and 14B, and control panel data interfaces 18A and 18B are serial data busses formatted according to the ARINC-429 data bus standard. However, other bus formats can be used, or the signals can be communicated using separate signal paths.

IVSDs 12A and 12B provide the pilot and the co-pilot with redundant vertical situation displays. In addition, the input and output interfaces for IVSDs 12A and 12B are the same. Thus, unless otherwise noted, the remainder of this discussion describes only a single IVSD 12, with its input and output interface signals, and the A or B suffix following the reference numeral in FIG. 1 is omitted.

IVSD 12 receives signals providing vertical profile information for the aircraft from a plurality of sources. For example, FIG. 1 shows IVSD 12 receiving signals from: a Flight Management System (FMS) via data link 20; an Air Data Computer (ADC) via data link 22; a Traffic Alert and Collision Avoidance System (TCAS) via data link 24; and an Enhanced Ground Proximity Warning System (EGPWS) via data link 26. Cross-side data transmitted on interfaces 14A and 14B is provided to the FMS and EGPWS systems. In one embodiment of system 10, data links 20, 22, 24 and 26 are implemented as serial data busses according to the ARINC-429 standard. However, other bus formats can be used, or signals can be communicated using separate signal paths.

The function and structure of FMS, ADC, TCAS, and EGPWS systems are known in the art of aircraft avionics. However, in a particular aircraft installation, IVSD 12 may be coupled to only a subset of these systems (e.g, the aircraft may not have an EGPWS system installed), or IVSD 12 may be coupled to another avionics system which provides vertical situation information for the aircraft.

IVSD 12 receives analog and discrete input signals containing vertical situation information. The received analog input signals include a Radio Altitude (RA) signal provided as an analog voltage on conductor 28 from the aircraft's Radio Altimeter (not shown), and a Heading signal provided on conductor 30. The received discrete input signals include a Vertical Sync discrete provided on conductor 32 and used to synchronize IVSDs 12A and 12B to the same Altitude Preselect value, and an FMS Selected discrete provided on conductor 34 and used to indicate that waypoint data from the FMS should be displayed.

IVSD 12 generates several discrete output signals. A Decision Height (DH) minimum audio/visual discrete is output on conductor 36 for driving an audible or visual warning indicator when the Radio Altitude signal received on conductor 28 reaches the DH Set value (set by an input device on control panel 16). An Altitude Alert discrete is output on conductor 38 for driving an aural alarm when the Baroset Altitude reaches an Altitude Preselect value. An Autopilot Alt Mode discrete is output on conductor 40 when the aircraft's altitude reaches the Alt Preselect.

IVSD 12 uses the received signals to generate visible indicia on an electronic display which displays the complete vertical situation of the aircraft to the pilot or co-pilot in integrated form. The presentation and arrangement of the vertical situation information on the display allows the pilot or co-pilot to assess the aircraft's complete vertical situation with a minimum of cognitive processing, thereby decreasing the pilot or co-pilot's workload. Before describing the display itself, however, the hardware components of control panel 16 and of IVSD 12 are described in relation to FIGS. 2 and 3.

Figure 2:
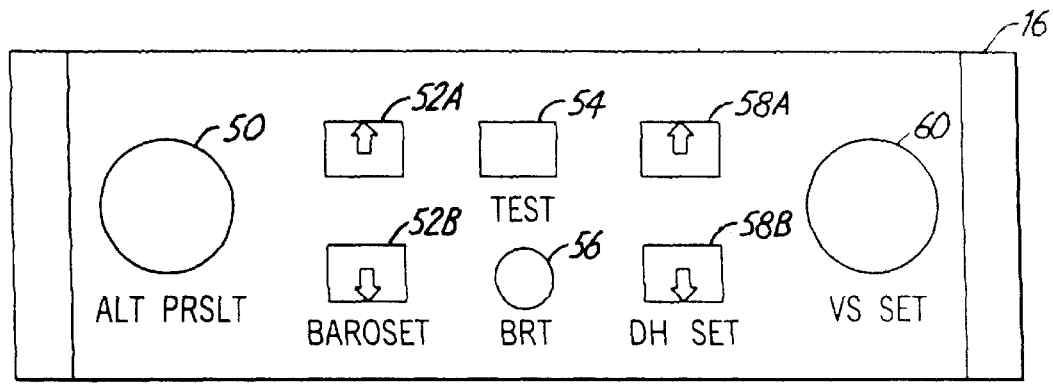
FIG. 2 is a front view of the operator control panel associated with each IVSD.

Referring to FIG. 2, each control panel 16 provides for integrated display management of its respective IVSD 12 via operator-actuatable input devices 50 through 60. These devices include an Altitude Preselector device 50, Baroset devices 52A and 52B, Test device 54, Brightness device 56, DH Set devices 58A and 58B, and VS Set device 60. Panels 16 include an internal control circuit (not shown) which reads signals from input devices 50 through 60, formats the signals into messages, and transmits the messages to IVSD 12 via an ARINC-429 data bus interface. The control panels 16A and 16B are mounted in the cockpit within convenient access of the pilot and co-pilot.

Altitude Preselector device 50 is used to select a desired altitude. Device 50 is, for example, a rotatable knob with an integrated push-button and "click" feedback. The desired altitude is typically a clearance altitude at which the pilot has been authorized to fly by Air Traffic Control (ATC). Upon receiving a desired altitude, the operator actuates (e.g., rotates) device 50 to select the desired altitude. The display of the Alt Preselect value on IVSD 12 (described below) gives feedback when device 50 is actuated. When the knob is moved slowly, a single click results in a 100 foot change in Altitude Preselect. When moved quickly, the Altitude Preselect value changes by 1000 feet per click. When the knob's push-button is pressed, Altitude Preselect is set to current altitude.

Baroset input devices 52A and 52B are used to select a desired baroset. Devices 52A and 52B are, for example, buttons with "click" feedback. The desired baroset is the local sea-level barometric pressure for the area in which the aircraft is flying, and is used to adjust the aircraft's pressure altimeter. The Baroset is typically provided to the operator by a ground controller. Upon receiving a desired Baroset, the operator actuates (e.g., pushes) devices 52A or 52B to select the desired Baroset. The display of Baroset value on IVSD 12 (described below) gives feedback when devices 52A and 52B are actuated. Pressing the upper button increases Baroset and pressing the lower button decreases Baroset. When either button is pressed temporarily (single click), Baroset is changed in the respective direction by 0.01 inches mercury. When either button is held down, Baroset is changed in the respective direction by 0.1 inches of mercury/ 0.5 second. When both buttons are pressed simultaneously, Baroset is preset to 29.92 inches or 1013.2 millimeters of mercury.

Test device 54 places IVSD 12 into a diagnostic mode if the aircraft is on the ground. Brightness device 56 controls the brightness of the IVSD's electronic display.

DH Set devices 58A and 58B are used to control the DH. Devices 58A and 58B are, for example, buttons with "click" feedback. DH is the height at which the pilot must decide whether to continue to land, or to go around on a missed approach, during an instrument landing. The pilot typically decides based upon whether he can see the runway when the aircraft reaches the DH. Typically, the pilot determines the DH by reference to an instrument approach chart for the particular approach. The display of DH on IVSD 12 (described below) gives feedback when devices 58A and 58B are actuated. Pressing the upper button increases the DH, and pressing the lower button decreases DH. When either button is pressed temporarily (single click), DH is changed in the respective direction by 10 feet. When either button is held down, DH changes in the respective direction by 100 feet per 0.5 second.

VS Set device 60 is used to select a desired VS. Device 60 is, e.g., a rotatable knob with an integrated push-button and click" feedback. The display of VS Set value on IVSD 12 (described below) gives feedback when device 60 is actuated. When the knob is moved slowly, a single click results in a 10 feet per minute change in VS Set. When moved quickly, the VS Set is changed by 100 feet/minute per click. When the push-button is pressed, the VS Set is set to the vertical speed of the aircraft.

This discussion describes one embodiment of input devices 50–60. It is to be appreciated that other input devices and other techniques for changing the various settings would be known to a person of skill in the art.

Figure 3:
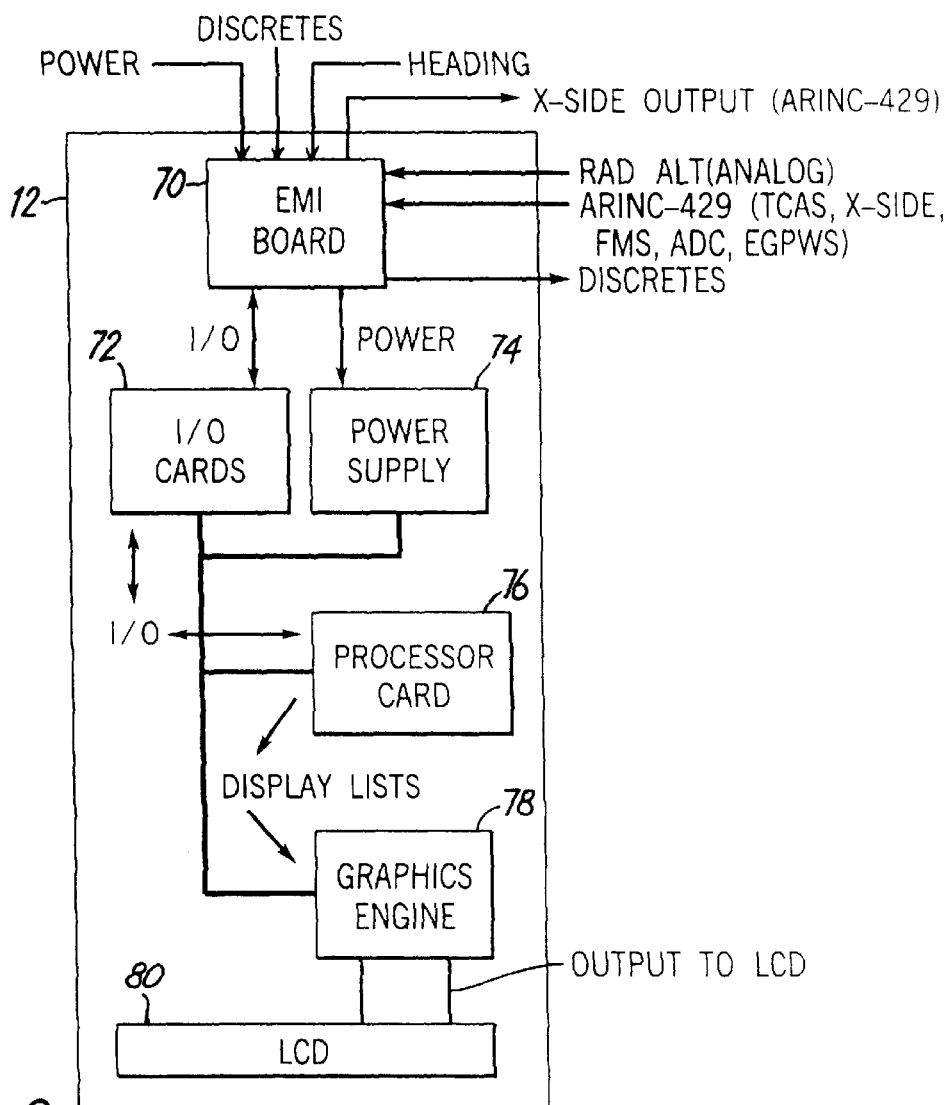
FIG. 3 is a hardware block diagram of each IVSD.

Referring to FIG. 3, hardware components of IVSD 12 include an EMI Board 70, Input/Output (I/O) Cards 72, a Power Supply 74, a Processor Card 76, a Graphics Engine 78, and an Electronic Display 80. EMI Board 70 provides EMI filtering of the I/O signals and power inputs of IVSD 12 according to EMI standards for the aircraft industry. I/O Cards 72 include interfaces between digital data used by Processor Card 76 and analog, discrete and databus I/O signals received and transmitted via EMI Board 70. Power Supply 74 converts external power received via EMI Board 70 into the voltages needed to operate other components.

Card 76 includes a processing circuit programmed to execute the functions of IVSD 12 described herein. These functions include reading vertical profile information signals received from the above-described sources (e.g., FMS, ADC, TCAS, and EGPWS systems), generating signals for driving the IVSD's outputs (e.g., discrete outputs on conductors 36, 38 and 40), and generating display lists which are used by graphics engine 78 to generate display signals applied to electronic display 80. The processing circuit may include, for example, a 320C31 Digital Signal Processor made by Texas Instruments, and display 80 may include an Active Matrix/Liquid Crystal Display (AM/LCD).

In one embodiment, the hardware implementation of IVSD 12 is that of the MFD-255 multifunction display unit of the FDS-255 AM/LCD Display System available from the Collins Avionics & Communications Division of Rockwell International Corp. of California. The differences between IVSD 12 and the Electronic Horizontal Situation Display (EHSI) and Electronic Altitude Director Indicator (EADI) display units include, for example, the I/O signals interfaced to IVSD 12 (FIG. 1), the programming of processor card 76, and the system functionality.

Figure 4:
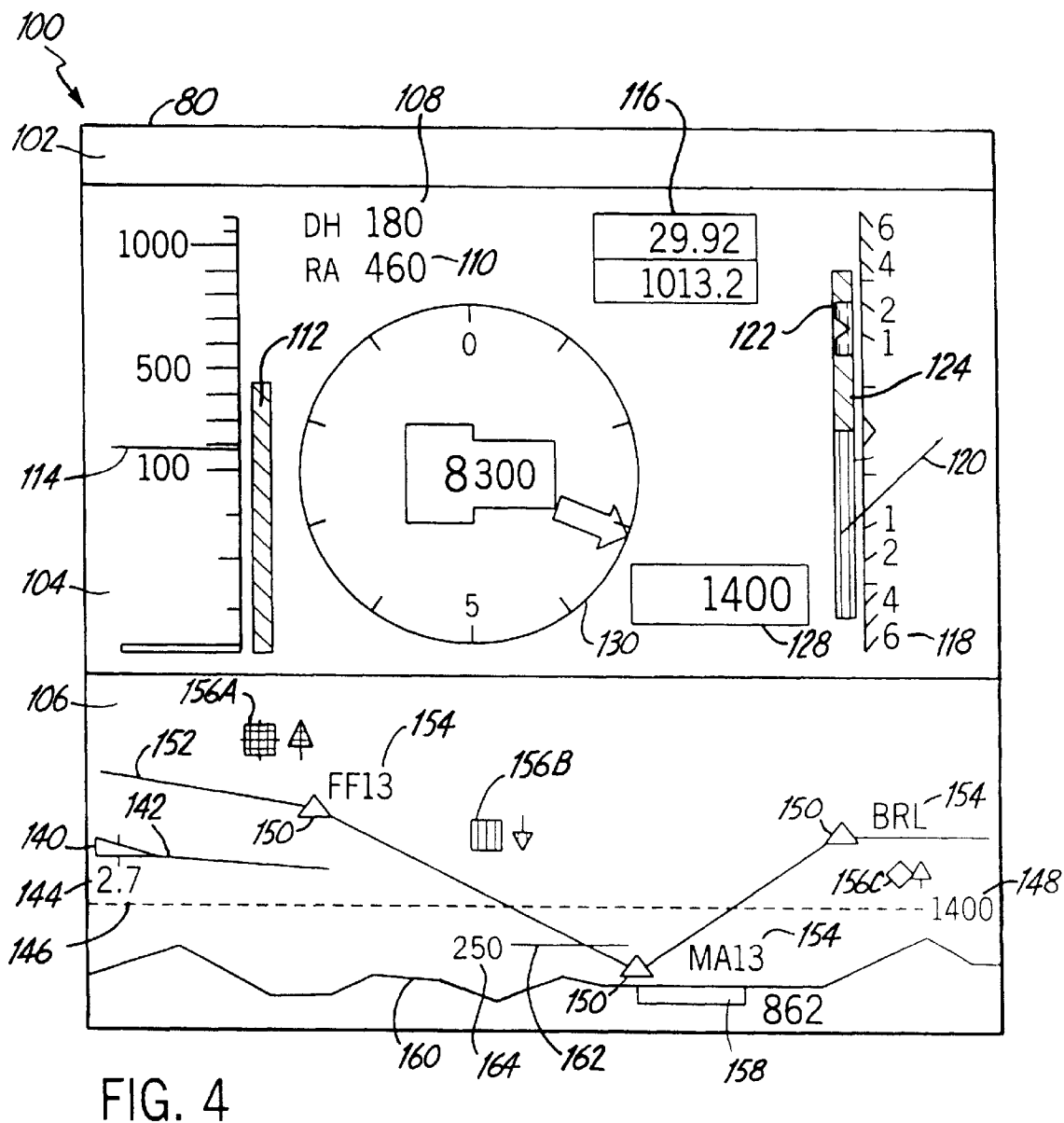
FIG. 4 is a front view of the IVSD display screen which shows an exemplary integrated vertical situation.

The primary function of IVSD 12 is to display the current vertical situation of the aircraft, including the aircraft's Barometric Altitude, Radio Altitude, VS, and a vertical profile view of the current flight plan/selected navigation source. In FIG. 4, the vertical situation display seen by the pilot or co-pilot on display 80 is shown for an exemplary vertical situation. The viewing area of display 80 is organized into three view areas: a Free Format line view area 102 at the top line of the display; an Altitude/VS view area 104 below view area 102; and a vertical profile view area 106 at the bottom.

When a Free Format message is received from the FMS using the Free Format label of ARINC-429, the message is displayed within Free Format line view area 102. The color of the Free Format message is commanded by the FMS.

The elements represented by visible indicia or symbols displayed in Altitude/VS view area 104 include:

A digital DH indicator 108 represents the DH value set using DH Set devices 58A and 58B, and received from control panel 16 via ARINC-429 label. The DH value may also be received from the cross-side IVSD 12 via ARINC-429 label to allow the pilot and co-pilot IVSDs 12A and 12B to be synchronized to the same DH value.

Two visible elements represent Radio Altitude (RA). First, a digital RA indicator 110 is displayed when RA is within a first range (e.g., 0 to 2500 feet). Second, a RA tape indicator 112 is displayed when RA is within a second range (e.g., 0 to 1200 feet). RA is received from the aircraft's Radio Altimeter via an analog voltage on conductor 28. Another DH indicator 114 representing DH may be displayed as a cyan bar on RA tape indicator 112.

A digital Baroset indicator 116 represents the Baroset value set using devices 52A and 52B, and received from control panel 16 via ARINC label. The Baroset value is displayed both in inches and millimeters of mercury. Baroset may also be received from the cross-side IVSD 12 via ARINC-429 label. Four visible elements represent the VS situation of the aircraft. First, a VS Scale 118 represents a range of vertical speeds (e.g., +/−6000 feet/minute). Second, a VS indicator (e.g., needle) 120 represents the vertical speed received from the ADC via ARINC-429 label. Needle 120 is displayed in reference to VS Scale 118 (e.g., by pointing to VS Scale 118). Third, a VS Set indicator (a "bug") 122 represents the VS Set set by device 60, and received from control panel 16 via ARINC-429 label, or from the cross-side IVSD 12 via ARINC-429 label. Bug 122 is displayed in reference to VS Scale 118, but only when a VS Enable bit is set in the ARINC labels from the FMS. VS Set values in both IVSDs 12A and 12B are synchronized to the same value when the Vertical Sync discrete on conductor 32 is enabled. Fourth, when TCAS advisories are received from TCAS via ARINC-429 label, green and red TCAS Advisory indicators (e.g., bars) 124 and 126 are displayed in reference to VS Scale 118. Red bar 126 is an "avoid" region indicating that those vertical speeds should be avoided, while green bar 124 is a "safe" region indicating safe vertical speeds. The display of bars 124 and 126 is suppressed if no TCAS target poses a danger. If needle 120 points to a green bar 124 or a red bar 126, VS needle 120 is displayed in green or red, respectively. VS needle 120 is otherwise displayed in white.

The integration of these four display elements allows the pilot or co-pilot to easily ascertain his vertical speed situation. For example, the aircraft's vertical speed is easily compared to the VS Set value, and the affect of the current vertical speed during a TCAS advisory is easily determined (e.g., a red needle 120 indicates that the current vertical speed will not avoid the TCAS problem, while a green needle indicates that the current vertical speed will avoid the problem).

A digital Alt Preselect indicator 128 (within a box) represents the Altitude Preselect value set by device 50, and received from control panel 16 via ARINC-419 label. Alt Preselect can also be received from cross-side IVSD 12 via ARINC-429 label to synchronize the Alt Preselect values in both IVSDs 12A and 12B to the same value when the Vertical Sync discrete on conductor 32 is enabled.

A Barometric Altitude indicator 130 represents the uncorrected Pressure Altitude value received from the ADC via ARINC-429 label after correction by the Baroset bias. The bias is set by devices 52A and 52B, and received from control panel 16 via ARINC-429 label. Barometric Alt is displayed as a round dial instrument with digital readout in its center. The round dial instrument has an arrow which completes one revolution for every predetermined (e.g., 1000) feet of altitude change. X-side altitude may be used if the on-side Air Data Altitude sensor fails.

Vertical profile view area 106 displays the vertical situation of the aircraft for a first distance in front of, a second distance above, and a third distance below, the aircraft. The second and third distances may be the same or different. As an example, view area 106 may display the vertical situation for +20 nm in front of the aircraft, and +/−4000 feet above and below the aircraft. These numbers are only exemplary and may change depending upon the application, or may be operator-selectable. View area 106 defines a profile window having horizontal and vertical dimensions (e.g., +20 nm by +/−4000 feet).

To enhance readability, the edges of view area 106 may include hash marks spaced a fixed distance apart. For example, hash marks may be spaced on the vertical edge to represent each 1000 feet of altitude, and spaced horizontally to mark each 2 nm of lateral distance. The distances represented by the marks can change depending on the application, and the vertical profile view area can also show the vertical situation behind the aircraft.

The visible indicia or symbols that are displayed within view area 106 represent the following elements:

An aircraft symbol 140 represents the position of the aircraft. Symbol 140 may include, for example, a stationary white triangle. However, aircraft symbol 140 could be moved in accordance with the actual position of the aircraft if the top and bottom edges of view area 106 were defined to represent fixed altitudes. For example, if the bottom edge of view area 106 represents sea level, and the top edge represents 10,000 feet, aircraft symbol 140 could be moved up and down as the altitude of the aircraft changed within the range of 0 to 10,000 feet.

A path angle indicator 142 represents the profile path angle (PPA) of the aircraft. Indicator 142 may include, for example, a white dashed line of fixed length (e.g., 0.75 inches) extending from aircraft symbol 140 at an angle with respect to horizontal which represents the PPA. PPA is either Vertical Path Angle (VPA) for primary display or Flight Path Angle (FPA) for secondary display, and is calculated using values received from the FMS and/or the ADC. VPA is calculated based on aircraft vertical speed (VS) and ground speed (GS) as follows: VPA=tan$^{-1}$(VS/GS). If ground speed is not available from the FMS, however, FPA is calculated based on vertical speed (VS) and true airspeed (AS) as follows: FPA=tan$^{-1}$(VS/AS). The PPA is also displayed by a digital indicator 144.

An Alt Preselect indicator 146 represents the Alt Preselect value. Indicator 146 may include, for example, a cyan dashed line displayed at the appropriate altitude relative to the aircraft only when the Alt Preselect is mapped within the vertical range of the profile window (e.g., within +/−4000 feet of aircraft's altitude). The cyan line moves vertically as device 50 is actuated. Alt Preselect is also displayed by a digital indicator 148. When the Baro altitude reaches the altitude preselect, IVSD 12 outputs the Altitude alert discrete on conductor 38 to cause an aural tone to sound in the cockpit.

Waypoint indicators 150, and a Flight Path indicator 152, represent the aircraft's waypoints and flight path. Waypoint indicators 150 may include, for example, magenta triangles. Flight Path indicator 152 may include, for example, a segmented magenta line passing through the waypoint indicators 150. Indicators 150 and 152 are only displayed when the waypoints and flight path segments are mapped within the profile window (e.g., within +20 nm laterally and +/−4000 feet vertically of the aircraft). Waypoint indicators 150 are displayed only when the FMS Selected discrete on conductor 34 is enabled. Waypoint labels 154 are displayed next to waypoint indicators 150.

The TO waypoint is displayed, if within the profile window, equal to the TO waypoint's Altitude label sent from the FMS and at a distance equal to the current Distance to Go label sent from the FMS. The inbound course line to the TO waypoint is equal to the Inbound Vertical Angle sent from the FMS. If EGPWS is not operating, the succeeding waypoints are drawn at the altitude sent from the FMS for that waypoint and at a distance equal to the distance from the previous waypoint's Lat/Long to that waypoint's Lat/Long (i.e., the flight plan is "stretched out" in a straight line). If EGPWS is operating, the succeeding waypoints are drawn at the altitude sent from the FMS for that waypoint and at a distance equal to the distance from the previous waypoint's Lat/Long to that waypoint's Lat/Long if the waypoint's inbound course is within +/−30 degrees of the current heading and the previous course leg has been drawn. If no altitude is sent with a waypoint, the waypoint is drawn at the Altitude Preselect or the top or bottom location of the profile view if the Alt Preselect is above or below the profile view, respectively.

TCAS target symbols 156A, B and C represent TCAS targets received from the TCAS system via data bus 24. Symbols 156 include an attribute representing the degree of threat posed by the TCAS target. TCAS target symbols may include, for example, squares such as symbols 156A, B, and C colored yellow, red and white, respectively, to indicate that the respective aircraft requires caution, poses danger or the symbol is shown for information only. An arrow associated with each symbol shows the altitude trend direction of the target (up or down). TCAS symbols 156 are displayed only for targets at locations mapped within the profile window. Targets are displayed at the proper locations in view area 106 using data received from the TCAS bus. Relative altitude is used to position the targets vertically, and the equation to position the targets laterally is: sin(relative bearing) * distance.

A runway symbol 158 represents the MAP based runway. Runway symbol 158 may include, for example, a grey line having a fixed length of 0.25 inches displayed at the waypoint identified as the runway threshold by the FMS. Runway symbol 158 is displayed only when the runway is mapped within the profile window (e.g., within +/−4000 feet of the aircraft's altitude, and within +20 nm).

If an EGPWS is installed, a ground contour line 160 represents the ground contour along the current heading of the aircraft as received from the EGPWS data bus 26. Ground contour line 160 is displayed only when the ground contour is mapped within the profile window.

IVSD 12 receives two labels per block of information from the EGPWS: the Block Number/Elevation and Current Aircraft Location Block Number labels. IVSD 12 sends two labels to the EGPWS: the Number of Increments label (with a value of 22) and the Increment Size label (with a value of 1 nm). IVSD 22 receives and processes 22 blocks of terrain information, and displays the terrain if within the profile window. IVSD 12 starts drawing the terrain on the left side of the display using the block number equal to the aircraft's location block number. IVSD 12 continues drawing to the right, wrapping around the block numbers. Each block altitude location is connected with a brown line. If EGPWS is not available, terrain profile is not displayed. If a waypoint is a runway threshold, grey runway symbol 158 emanates from the runway location.

Another DH indicator 162 is shown, for example, by a cyan line intersecting flight path indicator 152 at the appropriate altitude above the runway. DH is displayed digitally by an indicator 164 adjacent to indicator 162.

As described above, vertical profile view area 106 displays the aircraft's vertical situation for distances in front of, above, and below the aircraft. For example, view area 106 may show the vertical situation for +20 nm in front of the aircraft, and for altitudes of +/−4000 feet with respect to the aircraft's altitude. Thus, view area 106, which defines the profile window, displays the complete vertical situation for the pilot and co-pilot.

Also as described above, the visible indicia which represent some of the elements are displayed in view area 106 only when they are mapped within the profile window. These elements include the Alt Preselect indicator 146, the flight path indicator 152, waypoint symbols 150, TCAS target symbols 156, runway symbol 158, and ground contour indicator 160. The locations of the indicia within area 106 is determined by applying common scaling to position data associated with each indicia such that it is placed at the correct location within the profile window.

The common scaling used to position the visible indicia within view area 106 causes the visible indicia to correctly show their interrelationships to each other, and to the lateral and vertical distances represented by the profile window. The visual interrelationships of the displayed indicia allow the pilot or co-pilot to easily assess the complete vertical situation of the aircraft. The integrated nature of the display allows the situation to be assessed with a minimum of cognitive processing, thereby decreasing operator workload, stress and fatigue.

For example, the integrated display of FIG. 4 shows the following exemplary information: the position of the aircraft, the Path Angle, the Flight Path, the Waypoints, three TCAS Targets and degrees of threat posed by those targets, the Altitude Preselect, the DH, the runway, and the ground contour line. The display further shows the interrelationships among the vertical situation elements.

The operator's workload is also reduced by the integrated nature of the vertical speed indicia within view area 104, and the interrelationships between this portion of the display and view area 106.

Thus, the disclosed display presents and arranges vertical situation information for the aircraft in an integrated format to allow the operator to easily assess the complete vertical situation. The integrated nature of the display decreases the operator's workload, stress and fatigue levels as compared to prior art systems.

While the embodiments illustrated in the FIGs. and described above are presently preferred, it should be understood that these embodiments are offered by way of example only. For example, the control panel described herein may include other combinations or types of input devices, or the signals generated by the input devices could be interpreted differently than described herein. A particular aircraft may include other vertical profile information sources that can be linked to the IVSD. The invention is not limited to a particular embodiment, but extends to various modifications that nevertheless fall within the scope of the appended claims.

What is claimed is:

1. An avionics system for an aircraft, the aircraft having a plurality of vertical profile information sources, comprising:

an integrated vertical situation display (IVSD) for displaying a vertical situation of the aircraft wherein the IVSD further comprises:
      a free format line view area for displaying free format messages from the vertical profile information sources;
      an altitude/vertical speed view area for displaying vertical profile information from the vertical profile information sources; and
      a vertical profile view area for displaying the vertical situation of the aircraft in response to the vertical profile information sources; and
   a control panel for providing integrated display management of the IVSD wherein the control panel comprises operator-actuatable input devices.

2. The avionics system of claim 1 wherein the IVSD further comprises:

a plurality of input interfaces for receiving vertical profile information signals from the plurality of vertical profile information sources;
   a processing circuit coupled to the plurality of input interfaces for reading the vertical profile information signals and generating display signals; and
   an electronic display for displaying the display signals.

3. The avionics system of claim 2 wherein the display signals cause the display to generate a plurality of visible indicia representative of the plurality of vertical profile information signals.

4. The avionics system of claim 1 wherein the vertical profile view area displays the vertical situation for distances in front of, above, and below the aircraft thereby defining a profile window.

5. The avionics system of claim 1 wherein the vertical profile information sources are al least two selected from the group consisting of a flight management system (FMS), an air data computer (ADC) a traffic alert and collision avoidance system (TCAS), and a ground proximity warning system (GPWS).

6. The avionics system of claim 1 wherein the vertical profile view area displays an aircraft symbol representing the position of the aircraft and when mapped within the profile window, a flight path line, a TCAS target symbol, an altitude preselect line, an indication of decision height, a ground contour line, and a runway symbol.

7. The avionics system of claim 1 wherein the free format line displays a free format message from a flight management system.

8. The avionics system of claim 1 wherein the altitude/vertical speed view area displays vertical profile information including a decision height indicator, a radio altitude indicator, a baroset indicator, a barometric altitude indicator, and a vertical speed indicator.

9. The avionics system of claim 1 wherein the control panel operator-actuatable input devices further comprise:
   an altitude preselector device to select a desired altitude preselect for display on the IVSD;
   a baroset device to select a desired baroset for display on the IVSD;
   a decision height device to select a desired decision height for display on the IVSD; and
   a vertical speed device to select a desired vertical speed for display on the IVSD.

10. An avionics system with an integrated vertical situation display (IVSD) for an aircraft, the aircraft having a plurality of vertical profile information sources, the IVSD further comprising:
   a plurality of input interfaces for receiving vertical profile information signals from the plurality of vertical profile information sources;
   a processing circuit coupled to the plurality of input interfaces for reading the vertical profile information signals and generating display signals; and
   an electronic display for displaying the display signals wherein the electronic display further comprises:
   an altitude/vertical speed view area for displaying vertical profile information; and
   a vertical profile view area for displaying the vertical situation of the aircraft in response to the display signals; and
   wherein the electronic display further comprises a free format line view area for displaying free format messages in response to the display signals.

11. The avionics system of claim 10 further comprising a control panel wherein said control panel further comprises:
   an altitude preselector device to select a desired altitude preselect for display on the IVSD;
   a baroset device to select a desired baroset for display on the IVSD;
   a decision height device to select a desired decision height for display on the IVSD; and
   a vertical speed device to select a desired vertical speed for display on the IVSD.

12. The avionics system of claim 10 wherein the display signals cause the display to generate a plurality of visible indicia representative of the plurality of vertical profile information signals.

13. The avionics system of claim 10, wherein the vertical profile view area displays the vertical situation for distances in front of, above, and below the aircraft thereby defining a profile window.

14. The avionics system of claim 10, wherein the vertical profile information signals are received from at least two vertical profile information sources selected from the group consisting of a flight management system (FMS), air data computer (ADC), a traffic alert and collision avoidance system (TCAS), and a ground proximity warning system (GPWS).

15. The avionics system of claim 13, wherein the visible indicia generated on the display includes an aircraft symbol representing the aircraft.

16. The avionics system of claim 15, wherein the visible indicia includes a path angle line extending from the aircraft symbol at an angle with respect to horizontal which represents a profile path angle of the aircraft.

17. The avionics system of claim 12, wherein the IVSD displays the desired altitude preselect as an altitude preselect indicator line and a digital altitude indicator on the vertical profile display area and a digital altitude preselect indicator of the altitude/vertical speed view area.

18. The avionics system of claim 12, wherein the IVSD displays the desired baroset as digital baroset indicator on the altitude/vertical speed view area.

19. The avionics system of claim 12, wherein the IVSD displays the desired decision height as a digital decision height indicator on the altitude/vertical speed view area and a digital decision height indictor and a decision height line intersecting a flight path line on the vertical profile display area.

20. The avionics system of claim 12, wherein the IVSD displays the desired vertical speed (VS) as a VS set indicator on a VS scale on the altitude/vertical speed view area.

21. The avionics system of claim 10 wherein the altitude/vertical speed view area displays a digital radio altitude indicator and tape radio altitude indicator.

22. The avionics system of claim 10 wherein the altitude/vertical speed view area displays a round dial barometric altitude indicator and a digital readout barometric altitude indicator.

23. The avionics system of claim 10 wherein the altitude/vertical speed view area displays a vertical speed indicator.

24. An avionics system with an integrated vertical situation display (IVSD) for an aircraft, the aircraft having a plurality of vertical profile information sources, the IVSD further comprising:
   a free format line view area for displaying free format messages from the vertical profile information sources;
   an altitude/vertical speed view area for displaying vertical profile information from the vertical profile information sources; and
   a vertical profile view area for displaying the vertical situation of the aircraft in response to the vertical profile information sources.

25. The avionics system of claim 24 further comprising a control panel wherein said control panel further comprises:
   an altitude preselector device to select a desired altitude preselect for display on the IVSD;
   a baroset device to select a desired baroset for display on the IVSD;
   a decision height device to select a desired decision height for display on the IVSD; and
   a vertical speed device to select a desired vertical speed for display on the IVSD.

* * * * *